United States Patent
Tavares Da Silva Vinhas

(10) Patent No.: US 7,766,384 B2
(45) Date of Patent: Aug. 3, 2010

(54) PROTECTION COVER OF THE BAG VENTILATION ORIFICE OF AN AIRBAG MODULE

(75) Inventor: Joana Francisca Tavares Da Silva Vinhas, Valladolid (ES)

(73) Assignee: Dalphi Metal Espana, S.A., Madrid (ES)

( * ) Notice: Subject to any disclaimer, the term of this patent is extended or adjusted under 35 U.S.C. 154(b) by 242 days.

(21) Appl. No.: 12/157,198

(22) Filed: Jun. 6, 2008

(65) Prior Publication Data

US 2009/0001693 A1    Jan. 1, 2009

(30) Foreign Application Priority Data

Jun. 29, 2007    (EP) .................................. 07380195

(51) Int. Cl.
*B60R 21/276* (2006.01)
(52) U.S. Cl. .................................................... 280/739
(58) Field of Classification Search ............. 280/728.3, 280/739; 40/526, 524
See application file for complete search history.

(56) References Cited

U.S. PATENT DOCUMENTS 4,360,223 A * 11/1982 Kirchoff ..................... 280/729
5,704,639 A * 1/1998 Cundill et al. .............. 280/739
5,725,244 A * 3/1998 Cundill ...................... 280/739
5,839,755 A * 11/1998 Turnbull ..................... 280/739
6,017,057 A * 1/2000 O'Docherty ................ 280/739
6,056,318 A * 5/2000 Braunschadel ............. 280/739
7,413,219 B2 * 8/2008 Neira Sarmiento et al. .. 280/739
2009/0001697 A1 * 1/2009 Carvalho Marques ....... 280/736

FOREIGN PATENT DOCUMENTS

EP          1022198 A1 *  7/2000

* cited by examiner

*Primary Examiner*—Toan C To
*Assistant Examiner*—Karen Jane J Amores
(74) *Attorney, Agent, or Firm*—Ladas and Parry LLP

(57) ABSTRACT

Airbag module to protect a vehicle occupant in the event of a collision comprising an expandable bag (11) with gas provided by a generator with, at least, one ventilation orifice (13) sealed with a patch that comprises an elastic membrane (25) destined to be broken as a result of pressure inside the bag (11) to allow gas discharge through the ventilation orifice (13), which is covered with a cover (21) secured to the bag (11) with, at least, one tearable seam (31); hence the opening of the ventilation orifice (13) occurs when the pressure inside the bag (11) is greater than the pressure required to break the membrane (25) plus the additional pressure necessary to tear the seam (31). The invention also comprises a procedure to manufacture the bag.

7 Claims, 1 Drawing Sheet

PROTECTION COVER OF THE BAG VENTILATION ORIFICE OF AN AIRBAG MODULE

INVENTION FIELD

This invention refers to an airbag module destined to protect a vehicle occupant in the event of collision and specifically a protection cover of the bag ventilation orifice of the airbag module.

This invention is applicable to the automobile industry in general, and specifically to the sector dedicated the manufacture and/or installation and/or assembly of auxiliary equipment and active safety devices in vehicles.

INVENTION BACKGROUND

Airbag modules consist of casings that comprise a folded bag, which inflates very quickly with gas from a generator after certain sensor devices detect a vehicle collision. This way, the bag unfolds in front of the driver or passenger, depending on location, and prevents their bodies from banging against any part of the vehicle.

In order to prevent the bag from being very rigid in its contact with the driver or passenger, acting as a ball and making the bounce off to cause an excessive impact to the person it unfolds on, they have been equipped with a ventilation orifice that serves to reduce the frontal pressure of the bag and, therefore, the possibility of causing damages when they are operated.

Furthermore, several methods have been used to close the gas discharge orifice and improve pressure control inside the bag than that offered by the variation in size of the orifice.

Using a sealing patch, it is possible to prevent the gas from immediately leaving through the discharge orifice, and only when the patch breaks.

Technology has proposed different types of patches with different means to control their breaking depending, to a greater or lesser extent, of a given resistance to gas pressure inside the bag. This makes the presence of gas pressure necessary for the bag to fulfil its protection function compatible with the guarantee that the gas pressure shall not be excessive, with the consequent risk to persons the bag unfolds for.

Fabric patches have been proposed such as those described in U.S. Pat. No. 3,879,057, U.S. Pat. No. 4,097,065 and U.S. Pat. No. 5,018,761, which have not been successful due to the lack of uniformity of their breaking pressure as a result of their nature.

Plastic patches such as those in U.S. Pat. No. 3,573,885 have also not been successful due to the difficulty of controlling rupture pressure due to the variability of mechanical characteristics in plastic at different temperatures.

In this sense, it is currently considered that patches comprising elastic membranes such as silicone are the most suitable due to the good stability of the material to changes in temperature. Patches are used for varying shapes and thicknesses to control breaking pressure in order to optimize the vehicle occupant retention conditions. A good example is the one described in patent request EP 1022198.

The breaking pressure of a membrane is determined by the size of the sealed ventilation area, hardness of the material involved and its thickness, which may be constant or variable. This implies that airbag module manufacturers require a large variety of patches, both in terms of diameter (if, as is normal, circular patches are used) and thickness, in order to attend to the various types of airbag modules, making it difficult to standardize their production, which hinders the manufacturing of bags.

This invention is targeted to resolve this inconvenience.

SUMMARY OF THE INVENTION

An object of this invention is to provide bags for airbag modules with ventilation orifices at different aperture pressures using sealing patches with the same breaking pressure.

Another purpose of this invention is to optimize the manufacturing of bags for airbag modules making it possible to use standard sealing patches.

These and other objectives are achieved providing, in a first aspect, an airbag module to protect a vehicle occupant in the event of a collision involving an expandable bag with the gas provided by a generator with, at least, one ventilation orifice sealed with a patch that comprises an elastic membrane to be broken as a result of pressure inside the bag in order to allow gas discharge, in which the ventilation orifice sealed by the patch is covered with a cover secured to the bag using, at least, a seam that can be torn; hence the ventilation orifice opens when the pressure inside the bag is greater than the breaking pressure of the membrane plus the additional pressure necessary to tear the seam.

In a second aspect, such objectives are achieved providing a procedure to manufacture a bag for an airbag module with, at least, one ventilation orifice sealed with a patch comprising an elastic membrane, which involves the following phases: provide the panels required to manufacture bags, produce a ventilation orifice by making a small incision the bag with the shape desired for the orifice except in the area that connects the bag so that the cut piece can act as its own cover; secure the sealing patch to the bag; connect the cover to the bag using a seam that can be torn.

These and other characteristics and advantages of the invention shall be described more in detail below, for illustrative purposes however not limited to, and referenced to the attached drawings.

DETAILED DESCRIPTION OF THE INVENTION

Figure 1:
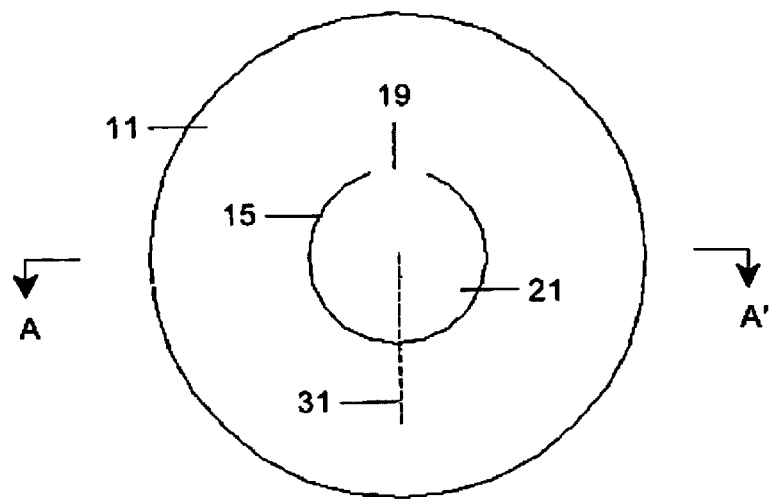
FIG. 1 is a drawing of an area of the bag in an airbag module as per a first part of this invention, comprising a ventilation orifice illustrating the cutting line of the orifice cover and a seam to secure the cover to the bag.
Figure 2A:
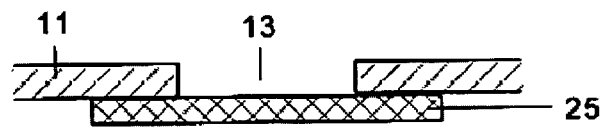
FIG. 2a is a transversal diagram of the bag area of an airbag module illustrated in FIG. 1 by the line A-A' with the ventilation orifice not covered by the cover and FIG. 2b is the same view with the cover over the ventilation orifice and secured to the bag.
Figure 2B:

In a first execution of this invention illustrated in FIGS. 1 and 2, it is possible to see the ventilation orifice 13 performed to bag 11 with a linear cut 15 and cover 21 created using the cut, which is connected to bag 11 by the small size area 19.

The ventilation orifice 13 is sealed using the elastic membrane patch 25, typically circular, and if required, with additional pieces. The membrane 25 has a predetermined breaking pressure, which is function, essentially of the material used and its thickness, either constant or variable, as well as the diameter of the ventilation orifice 13

For example, in an execution of the invention, the ventilation orifice 13 is circular shaped and a diameter of 50 mm and patch 23 has a predetermined breaking pressure of 200 mbar.

Moreover, cover 21 is secured to bag 11 through the tearable seam 31 that, depending on the seam type, thread used and stitch density, has a predetermined tear force.

For example, in the execution of the invention we are describing, cover 21 is secured to bag 11 using a backstitch with thread PA6.6 20/3 Nm and stitch density of 25. This results in a ventilation orifice 13 aperture of 310 mbar, which implies an addition pressure 110 mbar to the 200 mbar for breaking the membrane 25.

This way, cover 21 fulfils a double function: protect the sealing patch during the airbag assembly process and provide an additional element to control the ventilation orifice 13 aperture pressures.

In the mentioned example, the cover 21 is secured to bag 11 using seam 31 that provides a ventilation orifice 13 with an aperture pressure of 310 mbar using a membrane patch 25 with a breaking pressure of 200 mbar.

It is possible therefore to use standard sealing patches and provide the desired aperture pressure of ventilation orifices using covers secured to the bag with a seam that can be torn using the characteristics necessary to complement the breaking pressure provided by the patch.

Figure 3:
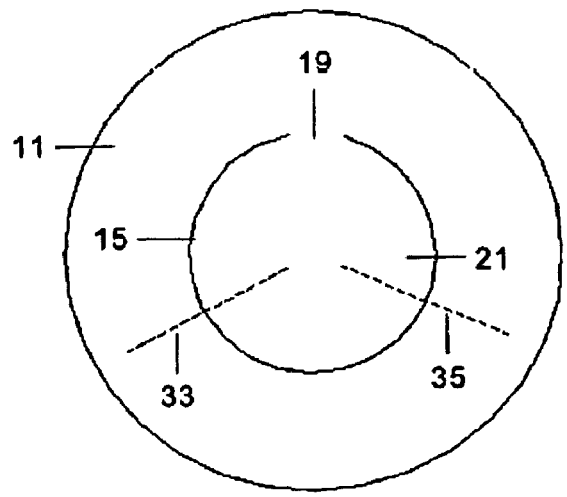
FIG. 3 is a drawing of a part of the bag of an airbag module according to a second execution of this invention in which a ventilation orifice is located illustrating the cutting line of the orifice cover and two seams securing the cover to the bag.

In this sense, a seam 31 can be used as displayed in FIG. 1, two seams 33, 35 as illustrated in FIG. 3 that show a ventilation orifice and seal 21 of greater size than FIG. 1 or more seams if required.

Good practical results are obtained when the additional pressure provided by the seam of cover 21 is between 10-60% of the membrane breaking pressure 25.

Experts on this matter will realize it is not necessary to form cover 21 by cutting the bag 11 and leaving an area 19 connected to the bag 11, but it is even possible to use a cover of a material different to the bag and a shape not necessarily equal to the ventilation orifice 13.

This invention is applicable to airbag modules with any kind of ventilation device that uses an elastic membrane. It is also applicable to multi-part patches and specifically multi-part patches and bags without a silicone lining.

An advantage of this invention is that only by varying the characteristics of the cover securing seams it is possible to provide bags of airbag modules with different ventilation performances.

Another advantage of this invention is that the possibilities of additional pressure control at the ventilation orifice provided by securing the cover to the bag through a seam only depends on one variable: the tear force of the seam.

Another advantage of this invention is that it allows using a small type of sealing patches than those currently used to provide a broad range of aperture pressures in ventilation orifices of airbags.

Although several executions of the invention have been described and represented, it is obvious that modifications can be made within its scope, and therefore should not be considered as limited to these executions, but the content of the following claims.

The invention claimed is:

1. Airbag module for protecting vehicle occupants in the event of a collision involving a bag (11) expandable with gas provided by a generator with, at least, a ventilation orifice (13) sealed with a patch that comprises an elastic membrane (25) that breaks as a result of pressure inside the bag (11) to allow discharging gas, characterized in that:
   a) the ventilation orifice (13) is covered with a cover (21);
   b) the cover (21) is secured to the bag (11) through, at least, one tearable seam (31) with which the aperture of the ventilation orifice (13) occurs when the pressure inside the bag (11) is greater than the breakage pressure of the membrane (25) increased with additional pressure necessary to tear the seam (31).

2. Airbag module according to claim 1, characterized in that the cover (21) is a piece resulting from practicing a cut in the bag (11) with the desired form of the ventilation orifice (13) except in a small area (19) that allows maintaining it connected to the bag (11).

3. Airbag module according to claim 2, characterized in that the ventilation orifice (13) has a substantially circular form and comprises at least one seam (31) in a radial direction.

4. Airbag module according to claim 3, characterized in that the cover (21) is secured to the bag through a single seam (31).

5. Airbag module according to claim 3, characterized in that the cover (21) is secured to the bag through two seams (33, 35).

6. Airbag module according to claim 1 characterized in that such additional pressure to tear said, at least, one seam (31) ranges between 10-60% of membrane (25) break pressure.

7. Procedure to manufacture a bag (11) for an airbag module with, at least, one ventilation orifice (13) sealed with a patch that comprises an elastic membrane (25), characterized in that it comprises the following steps:
   a) provide the necessary panels to manufacture the bag (11)
   b) perform at least one ventilation orifice (13) producing a cut in the bag (11) with the desired form of said orifice (13) except in the connection area (19) to the small size bag so that the cut piece can act as a cover (21) to it
   c) secure the orifice (13) patch to the bag (11)
   d) connect the cover (21) to the bag (11) with at least, one seam (31).

* * * * *